Oct. 17, 1961
H. F. PARKER ET AL
3,004,498
CONVEYOR POWER CHAIN LOAD PICK-UP UNIT
Filed Nov. 20, 1958
2 Sheets-Sheet 1
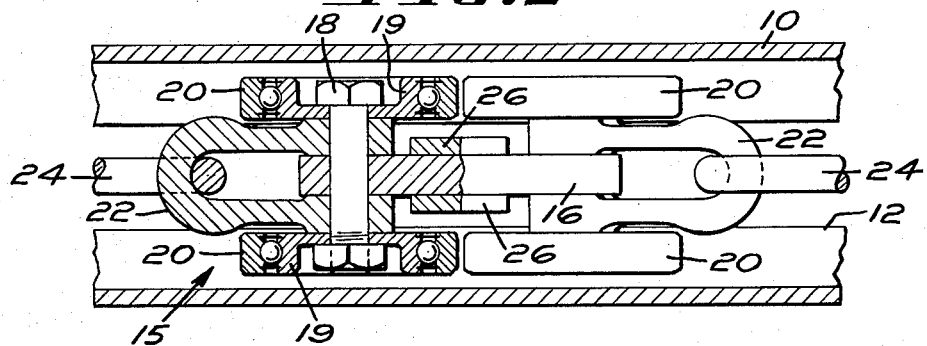
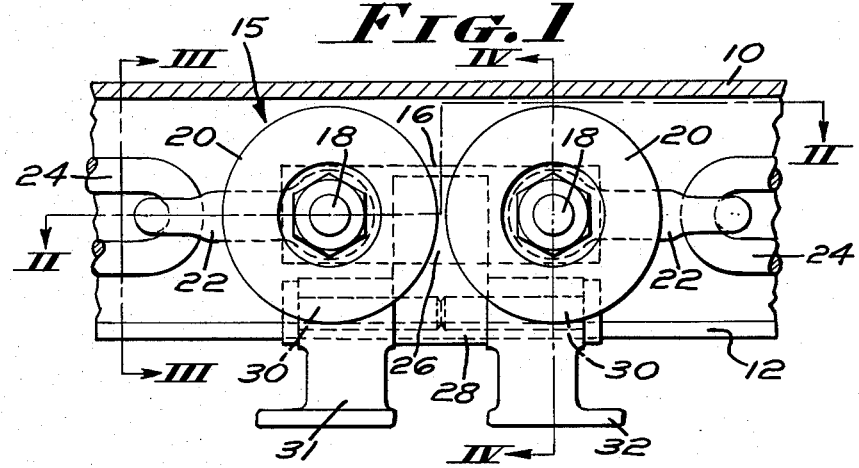
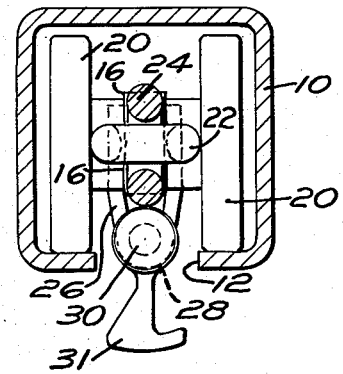
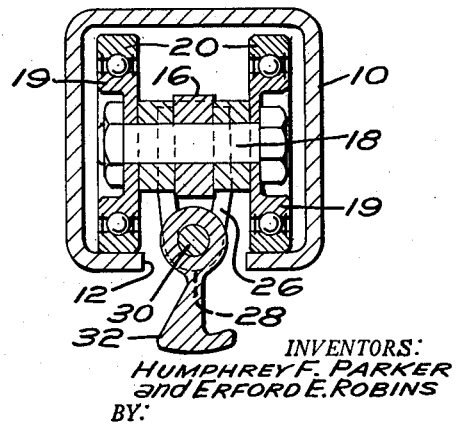
INVENTORS:
HUMPHREY F. PARKER
and ERFORD E. ROBINS
BY:
Beau, Brooks, Buckley & Beau,
ATTORNEYS.

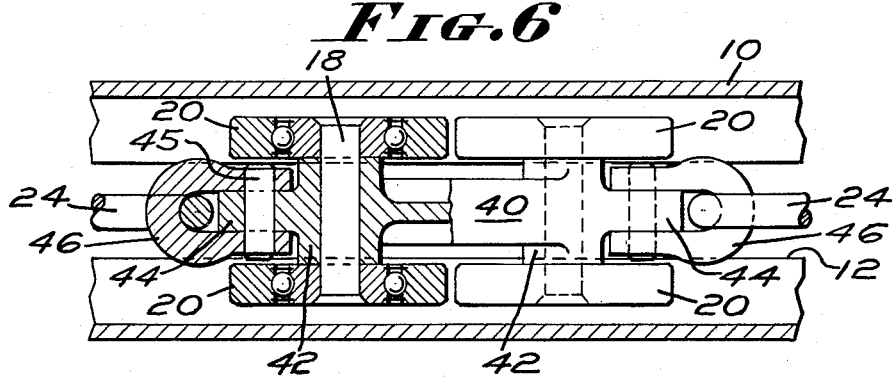
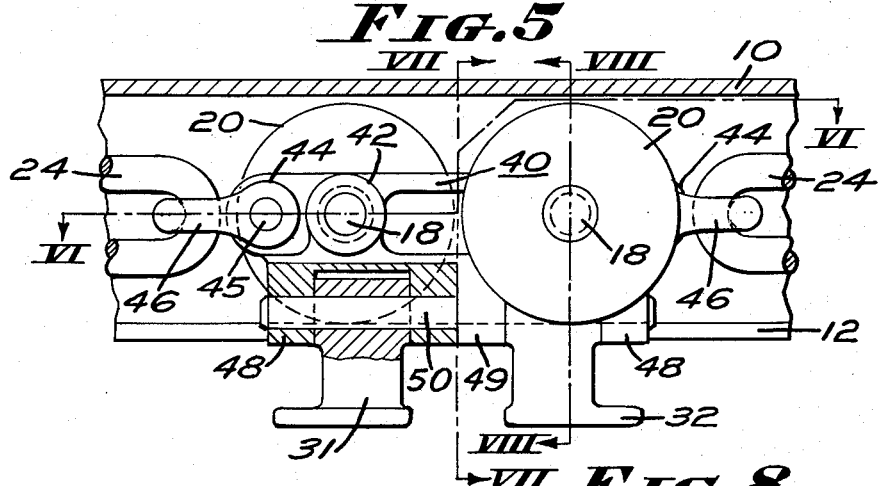
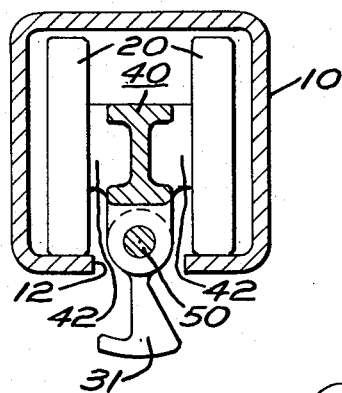
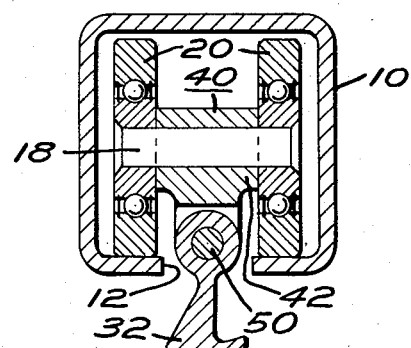
INVENTORS:
HUMPHREY F. PARKER
and ERFORD E. ROBINS
BY:
ATTORNEYS.

United States Patent Office 3,004,498
Patented Oct. 17, 1961

3,004,498
CONVEYOR POWER CHAIN LOAD PICK-UP UNIT
Humphrey F. Parker, Buffalo, and Erford E. Robins, North Tonawanda, N.Y., assignors to Columbus McKinnon Corporation, Tonawanda, N.Y.
Filed Nov. 20, 1958, Ser. No. 775,259
1 Claim. (Cl. 104—94)

This invention relates to chain-powered conveyors wherein power chains are provided with load pick-up or carrying means for moving hangers, trucks or other objects along trolley rails, tracks, floorways, or the like; for example, as in manufacturing or warehousing operations. The power chains referred to include wheeled drive units disposed to run in a slotted track rail with load pusher elements extending through the slot for selective engagements with load carrying trolleys or the like.

An object of the present invention is to provide an improved conveyor power chain load pick-up component for use in conveyor systems as aforesaid.

Another object is to provide an improved power chain unit as aforesaid which is economical to manufacture and easily assembled to provide a durable power chain pick-up unit.

Another object of the invention is to provide an improved unit as aforesaid which also functions as a vertical guide link for the power chain conveyor, which is of simple design requiring a minimum number of parts and which is inexpensive to manufacture.

Other objects and advantages of the invention will become apparent from the following specification, wherein the drawing illustrates various forms of the invention, and in which:

FIG. 1 is a fragmentary side elevational view of a conveyor power chain illustrating one form of the load pick-up unit of the invention;

FIG. 2 is a fragmentary top plan and horizontal sectional view of the unit of FIG. 1, taken on line II—II of FIG. 1;

FIGS. 3, 4, are sectional views taken on lines III—III and IV—IV respectively of FIG. 1;

FIG. 5 is a fragmentary side elevational view partly in section, showing another form of a power chain load pick-up unit of the invention;

FG. 6 is a composite top plan and sectional view taken on line VI—VI of FIG. 5; and FIGS. 7, 8, are sectional views taken on lines VII—VII and VIII—VIII respectively of FIG. 5.

Conveying systems of the type to which this invention relates include flexible power chains running in either overhead or underground trackways having load pick-up means extending from the trackway to engage load carrying hooks, racks, dollies, trolleys, or the like. For example, as shown herein the power chain supporting track is indicated at 10 to be of box-shaped cross section with the bottom wall thereof slotted as indicated at 12, so that the trackway is adapted for overhead conveyor use. However, the slot may be in the top or in either side wall of the track member, depending upon the relative position of the power chain and the work to be conveyed. The load pick-up units of the power chain are interspersed throughout the length of the chain at required intervals, and when the conveyor is being used for example in overhead relation to the workload as illustrated in the accompanying drawings, the pick-up units of the present invention will replace a corresponding member of the vertical guide links which would otherwise be used to give the chain the necessary vertical support and guide action.

As seen in FIGS. 1–4, the load pick-up units 15 of the chain each comprises a vertically standing keel plate 16 perforated at its opposite ends to receive transverse bolts 18—18 each of which mounts at its opposite ends the inner race or hub-portions 19—19 of ball bearing wheel means 20—20. The bolts 18—18 also receive the eye portions of clevis devices 22—22 at opposite ends of the keel plate, which in turn connect in articulated relation to links 24 of the power chain. At its central portion the keel plate 16 receives and mounts at its opposite sides in welded relation thereon the opposite legs 26—26 of a U-shaped support bracket which is formed with an eye portion 28 for receiving pins 30, 30. The pins 30, 30 in turn carry dogs 31, 32 in position to intercept the load to be picked up, such as for example through means of a knob (not shown) extending upwardly from a load carrying means. The dogs 31, 32 are so constructed that whenever the leading dog engages an object it will be tripped aside to allow the object or contact portion thereof to pass to a position where it will engage the following or driving dog. Thus the load moving arm will then be confined between the two dogs, and the leading dog will act to prevent the load from advancing at a greater rate of speed than the power chain, such as for example when the load is being moved through a downhill portion of the trackway.

A modified form of load pick-up unit of the invention is illustrated in FIGS. 5–8 wherein the "keel" of the device is a metal casting designated generally at 40 formed with integral bosses 42—42 at its opposite ends receiving the wheel axle bolts 18.

At its extreme ends, the keel casting 40 is provided with reduced width projections 44 which are bored to receive pins 45—45 connecting to clevis members 46—46 corresponding to the clevis members of the construction shown in FIGS. 1-4. Along its bottom edge, the keel casting is formed with two integral eye portions 48—48 (FIG. 5) and a central eye portion 49; the openings through the eye portions being in mutual alignment and carrying a pivot pin 50. In turn, the pivot pin swingably supports the dogs 31, 32 referred to hereinabove; it being understood that the pin 50 may be riveted over at its ends or otherwise arranged to avoid unintended dislodgment of the pin from the keel member. Thus, the dogs are suspended below the keel member between the eye portions thereof, and are adapted to swing laterally for load engaging purposes as explained hereinabove.

Bolts and rivets or the like may of course be used alternatively in the various modifications of the invention illustrated herein; but bolts will of course be used for connecting link purposes. From the above description it will be apparent that the load pick-up units of the invention will be very strong, yet flexible and smooth running; and may be produced by manufacturing operations and processes of simple and inexpensive nature. Although only a few forms of the invention have been illustrated and described hereinabove, it will be understood that various changes may be made therein without departing from the spirit of the invention or the scope of the following claim.

We claim:
A conveyor power chain load pick-up unit comprising a vertically disposed keel member including an elongate plate provided with apertures at its opposite ends, an axle received in each of said apertures, a clevis straddling each end of said plate and pivoted upon a respective axle, a pair of wheels carried by each axle at the outer ends thereof, each wheel including a stationary hub engaged against a respective leg of its associated clevis whereby the hubs are relatively widely spaced and each axle having means at its opposite ends drawing said hubs against the clevis legs whereby the axles serve to hold the entire assembly together, each wheel also including a rim rotat- ably mounted on its hub concentrically of the associated axle, said keel member also including a U-shaped support bracket fixedly depending from the central region of said plate, pin means carried by the lower end of said bracket and projecting fore and aft therefrom toward the opposite ends of said plate and between the associated pairs of wheels, a pair of laterally swingable dogs pivoted on and depending from said pin means one between each pair of wheels substantially in register below each of said axles so as to leave a space therebetween directly below said bracket and intermediate said axles for receiving and capturing a contact portion of an associated load carrying means.

References Cited in the file of this patent

UNITED STATES PATENTS

| | | |
|---|---|---|
| 2,446,685 | Barker | Aug. 10, 1948 |
| 2,609,082 | Leach | Sept. 2, 1952 |

FOREIGN PATENTS

| | | |
|---|---|---|
| 738,491 | Germany | Aug. 18, 1943 |
| 1,130,690 | France | Oct. 1, 1956 |